US005185113A

United States Patent [19]

Seyer et al.

[11] Patent Number: 5,185,113

[45] Date of Patent: Feb. 9, 1993

[54] SLIP-CAST CERAMIC COMPONENT AND A PROCESS FOR ITS PRODUCTION

[75] Inventors: Johannes Seyer, Roedental; Bernhard Freudenberg, Coburg, both of Fed. Rep. of Germany

[73] Assignee: Bayer Aktiengesellschaft, Leverkusen-Bayerwerk, Fed. Rep. of Germany

[21] Appl. No.: 902,456

[22] Filed: Jun. 19, 1992

Related U.S. Application Data

[62] Division of Ser. No. 670,904, Mar. 18, 1991, abandoned.

[30] Foreign Application Priority Data

Mar. 29, 1990 [DE] Fed. Rep. of Germany ....... 4010092

[51] Int. Cl.[5] ........ C04B 41/91

[52] U.S. Cl. ........ 264/67; 264/86; 264/162; 264/302

[58] Field of Search ........ 428/192, 34.4; 264/67, 264/86, 162, 302; 55/523, DIG. 30

[56] References Cited

U.S. PATENT DOCUMENTS 4,510,191 4/1985 Kagami ........ 428/34.4
4,714,640 12/1987 Morgan ........ 428/34.4
4,773,149 9/1988 Kip ........ 264/67

FOREIGN PATENT DOCUMENTS 0387422 10/1990 European Pat. Off. .
9010438 9/1990 Fed. Rep. of Germany .
1457646 11/1966 France .

OTHER PUBLICATIONS

Patent Abstracts of Japan, vol. 13, No. 477 (M-885) (3825) (1989).

*Primary Examiner*—James Derrington
*Attorney, Agent, or Firm*—Connolly & Hutz

[57] ABSTRACT

Slip-cast ceramic component having an internal chamfer which is optionally interrupted by an internally projecting area, obtainable by providing a slip cast blank of the ceramic component with uniform thickness and desired internal configuration wherein the volume corresponding to the internal chamfer is outwardly disposed and which is removed by external machining to arrive at the geometry of the ceramic component. The component is useful, inter alia, as a spacer ring which serves for the positioning of honeycomb-shaped catalyst blocks in exhaust gas lines.

5 Claims, 2 Drawing Sheets

SLIP-CAST CERAMIC COMPONENT AND A PROCESS FOR ITS PRODUCTION

This application is a division of application Ser. No. 07/670,904 filed on Mar. 18, 1991 now abandoned.

The present invention relates to a slip-cast ceramic component with internal chamfer which is optionally interrupted and a process for its production.

BACKGROUND OF THE INVENTION

Slip casting is suitable for the mass production of complicated geometries, especially those which have recessed areas. However, it generally provides a casting having a constant wall thickness. Defined wall thickness gradations within a hollow casting or one having chamfers thereon cannot be realized with this method of mass production.

In order to illustrate the problem, the example may be cited of the spacer ring which serves for the positioning of the honeycomb-shaped catalyst blocks in an exhaust gas line. On the face the part is provided with an internal chamfer (2), FIG. 1 . This is interrupted at several points by a projection (1). Corresponding spacer rings are obtained by grinding the internal outline. The grinding process must be interrupted in the course of this at the inward-facing projections. This means that the chamfer must be cut out with an expensive internal grinder with contouring control.

BRIEF DESCRIPTION OF THE INVENTION

The object of this invention is the provision of corresponding slip-cast ceramic components which are obtainable by an economic process which does not require internal grinding.

Surprisingly it has now been found that these requirements are met by a slip-cast component in which the internal chamfer, which is optionally interrupted, is obtained by arranging on the outside of the blank the volume to be removed, and performing the cutting work to arrive at the final geometry of the ceramic component by external machining.

Figure 1:
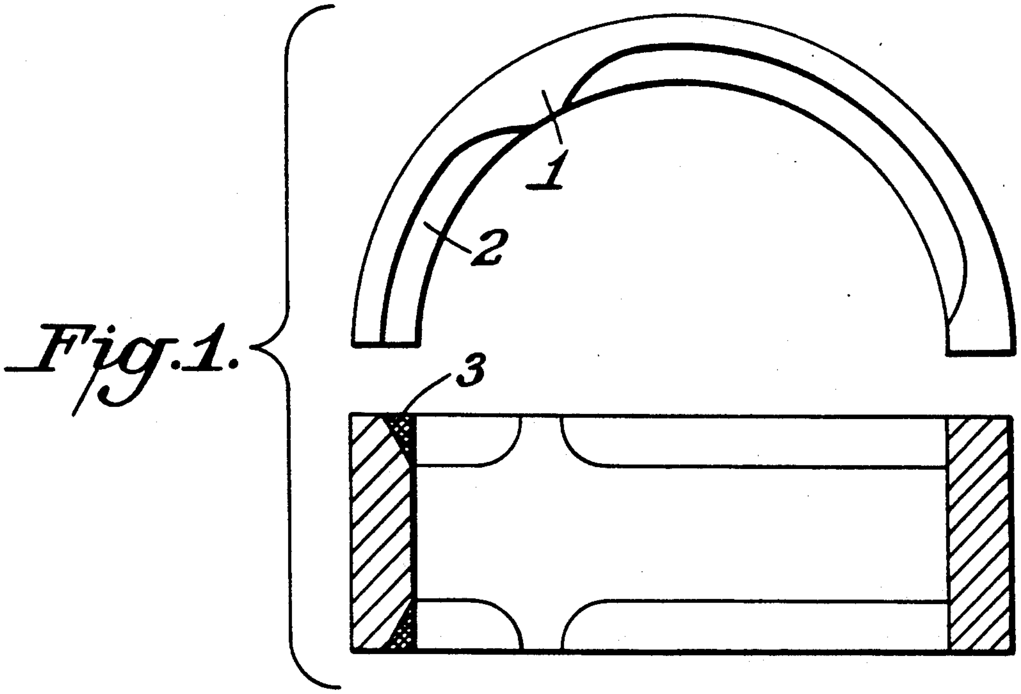
FIG. 1 illustrates a spacer ring obtained by a conventional method.
Figure 2:
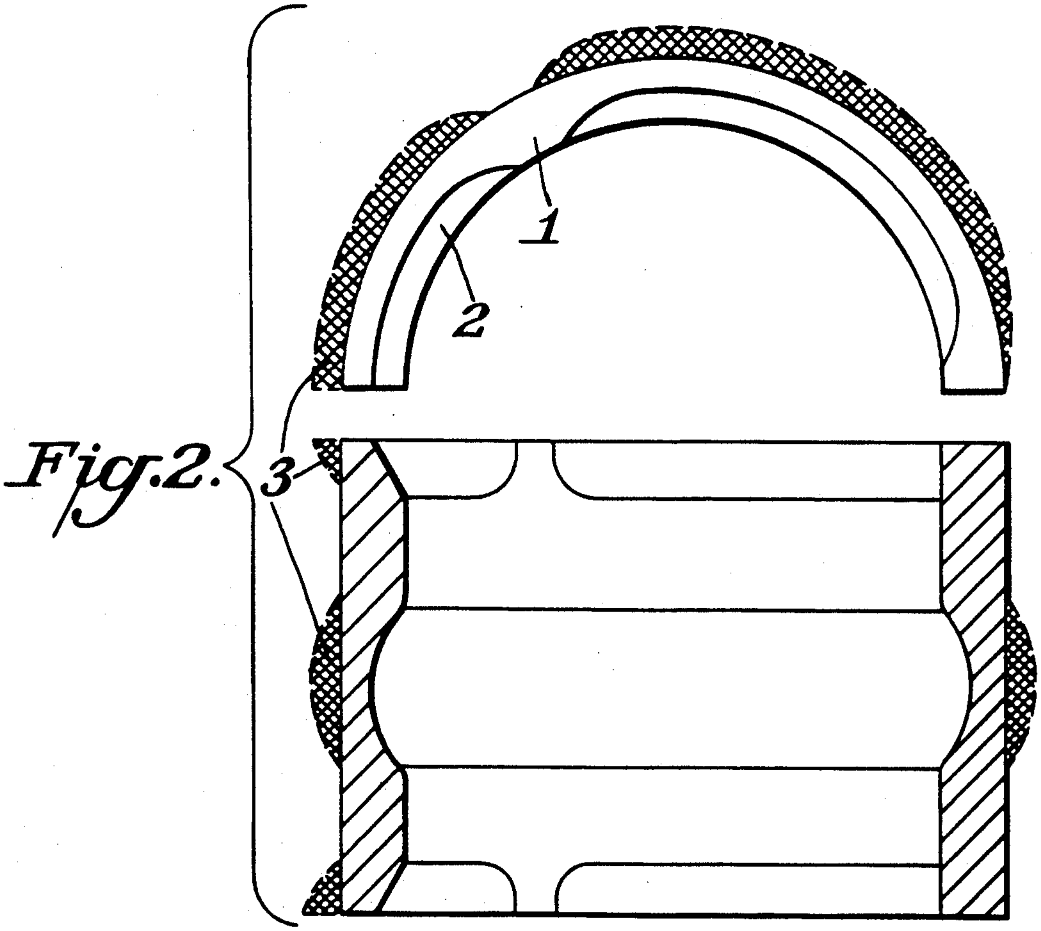
FIG. 2 illustrates a spacer ring of the present invention with the cross-hatched area 3 indicated as volume to be removed.

Here (1) signifies the projection of the internal chamfer, (2) the chamfer and (3) the volume to be removed. Preferably the ceramic component according to the invention is a spacer for catalyst use with variable wall thickness and interrupted internal chamfer.

DETAILED DESCRIPTION

This invention relates to a slip-cast ceramic component having an internal chamfer, which is optionally interrupted by an internally projecting area, obtainable by providing a slip cast blank of the ceramic component with uniform thickness and desired internal configuration wherein the volume corresponding to the internal chamfer is outwardly disposed and which is removed by external machining to arrive at the geometry of the ceramic component.

This invention also relates to a process for the production of a slip-cast ceramic component with an internal chamfer which is optionally interrupted, which comprises slip-casting a ceramic blank having a uniform thickness and a desired internal configuration with any volume to be removed provided on the outward configuration, then cutting or machining the external configuration only to remove outwardly disposed volume corresponding to the internal configuration thereby providing a smooth external surface.

The invention does not, however, relate only to rotationally symmetrical parts, and the concept according to the invention can be applied directly to non-rotationally-symmetrical parts with elliptical or complicated geometries.

The cutting to be carried out according to the invention can be carried out advantageously on the blank, on the presintered compact or the sintered compact in the finished fired state. With rotationally symmetrical ceramic components the external machining is preferably carried out by external turning or external cylindrical grinding. In the case of non-rotationally-symmetrical parts, other machining methods are possible, such as e.g. external grinding with contouring control.

Also subject matter of this invention is a process for the production of a slip-cast ceramic component with an internal chamfer which is optionally interrupted by employing a cutting process in which the volume to be removed is arranged on the outside before the blank is cut and external machining is carried out to arrive at the required geometry of the ceramic component.

The grinding process is externally no longer interrupted by the projections, which leads to a definite shortening of cycle times. Furthermore, during external grinding the diameters of the grinding wheel and spindle are not restricted in the same way as in internal grinding, which means that optimal grinding wheel sizes can be used. Finally it is possible to grip several rings in one clamping device and to machine them simultaneously or successively.

The ceramic component according to the invention is preferably a spacer ring for catalyst use with variable wall thickness and an interrupted internal chamfer. The cutting can then be carried out advantageously on the blank, on the presintered compact or on the sintered compact in the finished fired state. In the case of rotationally symmetrical components, the external machining is preferably carried out by external turning or external cylindrical grinding. In the case of non-rotationally-symmetrical parts with elliptical or complicated geometries, the external machining can be carried out by other methods, e.g. by external grinding with contouring control.

EXAMPLE 1

Ceramic spacer ring with an internal chamfer.

Figure 3:
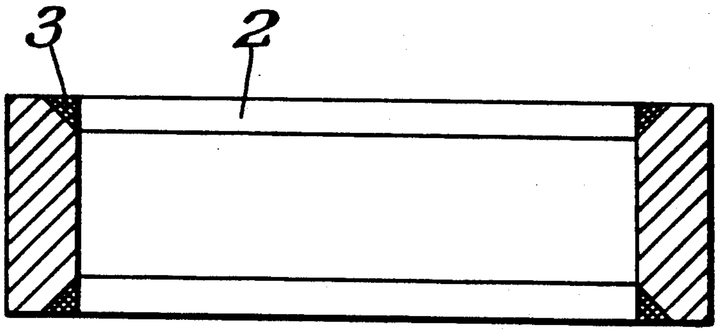
FIG. 3 illustrates constructionally required geometry.

The constructionally required geometry is shown in FIG. 3.

Figure 4:
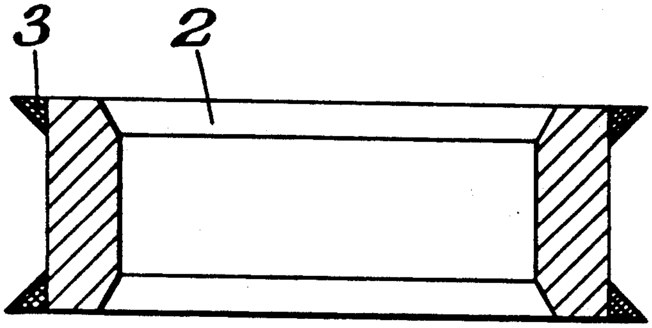
FIG. 4 illustrates an internal chamfer.

The internal chamfer is advantageously produced as shown in FIG. 4.

The advantages are: external grinding with grinding wheels of any desired diameter; rigid spindles capable of simultaneously accommodating a plurality of grinding wheels can be used for the processing of more than one component in one operating cycle; it is also possible to combine the grinding and release processes if the product of the moulding process is a combination of rings.

EXAMPLE 2

Ceramic spacer ring with an interrupted internal chamfer

The constructionally required geometry corresponds to that of FIG. 1.

Figure 5:
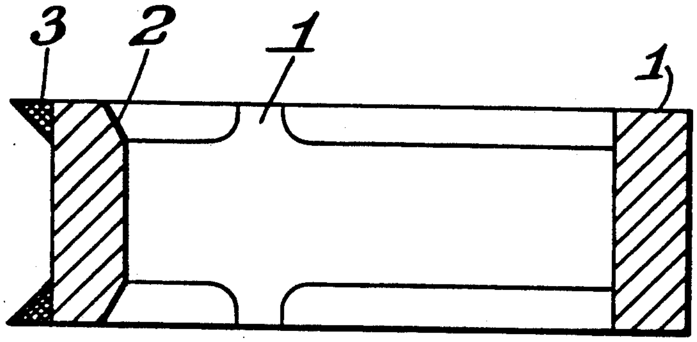
FIG. 5 illustrates an interrupted internal chamfer.

The interrupted internal chamfer is advantageously produced according to FIG. 5.

By altering the geometry in this manner the complicated internal machining of individual rings or combinations of rings can be avoided.

What is claimed is:

1. Process for the production of a slip-cast ceramic component with an internal chamfer which is optionally interrupted, which comprises slip-casting a ceramic blank having a uniform thickness, a desired internal configuration and an outwardly disposed volume having an external configuration, then cutting or machining the external configuration only to remove the outwardly disposed volume corresponding to the internal configuration thereby providing a smooth external surface.

2. Process according to claim 1 wherein the slip-cast ceramic component is a spacer ring for catalyst use with variable wall thickness and an interrupted internal chamfer.

3. Process according to claim 1 wherein machining removes exterior volume from the blank.

4. Process according to claim 1 wherein cutting removes exterior volume from the blank which is a presintered or a sintered compact.

5. Process according to claim 1 wherein external machining is carried out by external turning or external cylindrical grinding.

* * * * *